Sept. 17, 1968 G. HABERSTROH 3,401,898

TAKE-UP MAGAZINE FOR RECORD-CARRYING TAPES

Filed Sept. 10, 1965 3 Sheets-Sheet 1

INVENTOR
GUSTAV HABERSTROH
By Krafft & Wells
ATTORNEYS

TAKE-UP MAGAZINE FOR RECORD-CARRYING TAPES

Filed Sept. 10, 1965

3 Sheets-Sheet 2

INVENTOR
GUSTAV HABERSTROH
By Krafft & Wells
ATTORNEYS

TAKE-UP MAGAZINE FOR RECORD-CARRYING TAPES

Filed Sept. 10, 1965

INVENTOR

GUSTAV HABERSTROH

BY Krafft & Wells

ATTORNEYS

United States Patent Office 3,401,898
Patented Sept. 17, 1968

3,401,898

TAKE-UP MAGAZINE FOR RECORD-CARRYING TAPES

Gustav Haberstroh, Wilhelmshaven, Germany, assignor to Olympia Werke AG, Wilhelmshaven, Germany Filed Sept. 10, 1965, Ser. No. 486,380
Claims priority, application Germany, Oct. 13, 1964, O 104,371
17 Claims. (Cl. 242—55.13)

ABSTRACT OF THE DISCLOSURE

A take-up magazine for record-carrying tapes comprising a shallow housing that is open at one end for receiving a tape-carrying spool by edgewise insertion into the open end and a spool-receiving plate provided with a plurality of spool-centering and spool-driving members projecting only slightly above the upper surface of the plate to engage the bottom of the spool, whereby a spool slightly thinner than the open end is movable onto and removable from the receiving plate along a substantially horizontal path.

This invention relates to a magazine for record carrying tapes such as perforated or magnetic tapes. The invention has particular utility for tapes which have left a data processing machine at the delivery station.

The prior art discloses many winding devices for tape-like record carriers such as those disclosed in U.S. Patents Nos. 3,119,574 and 3,150,840. For example, the magnetic tape of sound reproduction devices after leaving the recording station is wound upon a rewinding spool. This method of winding the processed tape permits the record carrying tape to be rewound.

Magazines are also known in large data processing machines for perforated tapes which have passed a processing station. Also in this case the winding-up spool as well as the winding-off spool are driven from the same source of power with compensation for their changing radii. Such devices permit rapid back-and-forth winding of the record carriers to permit them to be quickly searched to locate particular places therein.

In many cases, however, such a winding up or unwinding of the record is not necessary. It is much more common to permit the record carrier tape after leaving the record forming station, e.g. a perforating station, to be released into the adjacent space. There results in a short time a tangled mass of the recording tape.

An object of this invention is to avoid such a tangled mass of the recording tape. To wind up record carriers of this kind, it is not necessary to use a precision driving mechanism which will be responsive to the effective diameters of the spools. Other objects of the present invention are to provide magazines which are not expensive to manufacture and are of compact construction which can be placed on an ordinary office desk without too much inconvenience.

Another object of the invention is to provide a magazine for receiving a recording tape partially wound upon a spool outside the magazine.

According to the present invention, it has been found that the problems of the prior art can be solved in a simple manner by a winding mechanism in the form of a flat shallow housing open at its front end, and upon the base of which a rotatable take-up plate is mounted. The take-up plate is provided with shallow driving members projecting only slightly from its upper surface. The open space in the housing above the plate is not much greater than the height of the spool where the spool is insertable and removable from the housing edgewise in a direction approximately parallel to the surface of the plate.

A special feature of the present invention is that the plate-supported spool-driving members can also serve to center the spool on the plate. Since the spool does not need to be mounted for rotation on a vertically extending axis or removed from the latter, it is possible for the spool to be mounted upon or removed from the plate by edgewise movement parallel to the plate within the very shallow space of the housing.

According to this invention the winding-up mechanism comprises a cover plate and a shallow bottom box to the floor of which a vertical post is mounted to serve as a bearing stud for the hub of the rotatable receiving plate.

Rotation is imparted to the receiving plate through a friction drum in the form of a cylindrical flange extending downwardly from the periphery of the plate and driven by a friction wheel mounted on a larger belt-driven pulley carried on the end of a swinging lever.

Another feature of this invention is that the lower portion of the housing is formed of one piece, with the side walls supported by stepped extensions of the base so as to form a bottom pan in which the vertical post and the swinging lever are positioned.

The upper longitudinal edges of the side walls are bent inwardly to carry a cover plate whose front and rear ends are bent downwardly to keep the cover at the proper elevation to maintain air circulating passageways between the cover and the side walls.

The cover plate is equipped with transverse strengthening ribs and is secured to the inwardly bent upper edges of the side walls by screws.

Since a precision drive is not necessary, the axial bearing of the receiving plate can be made as simple as desired. In the embodiments shown in the drawings, a bottom disk, preferably of synthetic resin such as nylon 6–6, is interposed between the vertical bearing post and the floor and extends beyond the periphery of the latter to provide a bearing surface for the lower end of the central hub of the receiving plate.

On top of the vertical post a retaining disk is fastened by screws, the periphery of the disk fitting in an enlarged portion of the bore of the hub to prevent the latter from sliding off the vertical post.

In the present invention the receiving plate does not have any central bearing post which would have to fit into a central hole in the spool. This makes it possible, as above mentioned, to keep the height of the housing above the receiving plate at a minimum by permitting the spool to be inserted and removed edgewise by movements that are mainly horizontal, and also does not require the spool to be anchored to the receiving plate by inconvenient levers for rotation with the latter.

To realize these advantages the receiving plate may be in the form of a circular disk with smaller disks on its surface to engage a corresponding number of spokes on the spool and to keep the spool centered on the receiving plate, thereby preventing any accidental shifting of the spool relative to the plate and rendering the use of a centering axis unnecessary.

In another embodiment of this invention, the receiving plate is in the form of a polygonal, preferably six-cornered disk which carries retaining lugs at its corners for engaging corresponding shoulders on the spool. This construction is likewise designed to permit easy insertion into and removal from the housing.

Another feature of this invention is a motor switch mounted in the bottom pan and connected through intermediate linkages with a switching bar whose front end projects from the front side of the housing through a slot in a guide bracket and carries at its end a knob for convenient manipulation. This permits the winding mechanism to be conveniently switched on or off while the device is contained in a compartment of a cabinet or desk.

Particular advantages of the present invention are that the record carrier is insertable into the housing through its open end and that a flap with a tape receiving edge and a tape deflecting edge is pivotally mounted to extend halfway over the open end of the housing, the flap being pivotable on a bolt screwed into a bearing flange at one side of the bottom of the housing.

The flap is provided with upper and lower bearing lugs to position it for pivotal movement on the bolt and is connected by a spring with the bearing flange. The flap consists specifically of a front plate with upper and lower edges, the free end of the front plate being formed with an inclined tape-deflecting edge to which the record carrier from the tape-receiving edge at the rear of the flap is passed. The bolt on which the flap is pivoted carries a sleeve with a smooth outer surface to receive the record carrier tape from the front side of the flap for passage between the sleeve and the adjacent wall of the housing into the interior of the housing. This permits a simple and elastic delivery of the strip to the winding mechanism since the flap under the action of the spring will compensate for disturbances in the rate of delivery of the strip.

This strip-guiding mechanism is particularly advantageous for the insertion of a spool into the winding mechanism. The leading end of the record carrier tape can be connected to the hub of the spool while the latter is still outside the housing, because with the pivot bolt connected at only one end to the housing, the record carrier does not need to be "threaded into" the housing between its side wall and the pivot bolt, it being only necessary to push the record carrier from above into the slit between the bearing bolt and the adjacent wall of the housing.

Other features and advantages of the invention will be apparent from the following description of the illustrative embodiments shown on the drawing wherein.

Figure 1:
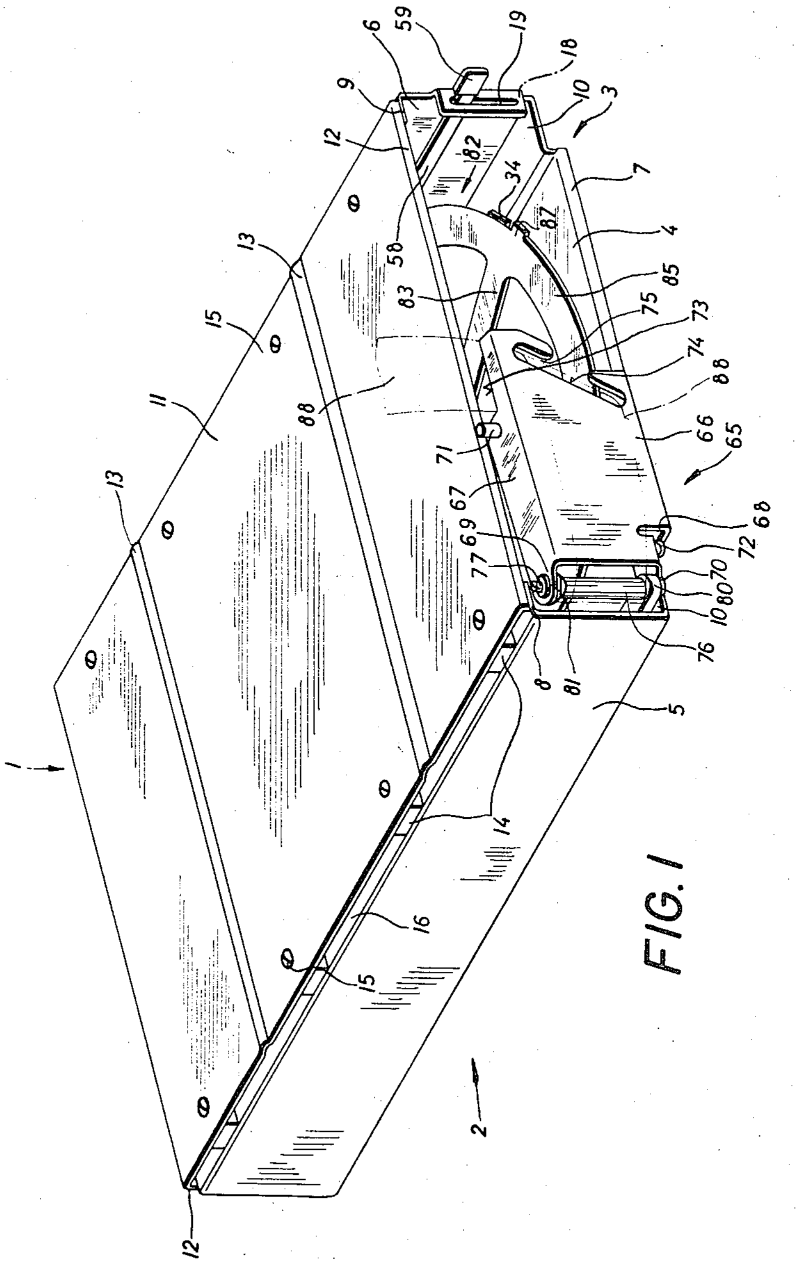
FIGURE 1 is a perspective view of one form of the complete apparatus.

The embodiment shown in FIGURE 1 is useful with spools of ordinary construction, and is also operable with spools which do not have a centering hole.

The housing 1 consists essentially of a bottom box 2 which is formed integral with the side walls 5 and 6 of the housing. A bottom pan 3 is formed by stepped portions 10 between the side walls 5 and 6 and the bottom surface 4 and serving as a support for the essential parts of the apparatus.

The front edge 7 of the base 4 is bent downwardly. The upper longitudinal edges 8 and 9 of the side walls 5 and 6 are bent inwardly and carry a cover plate 11 whose front and rear edges 12 are bent downwardly to serve as spacers to maintain an air gap between the cover plate 11 and the side walls 5 and 6.

Figure 3:
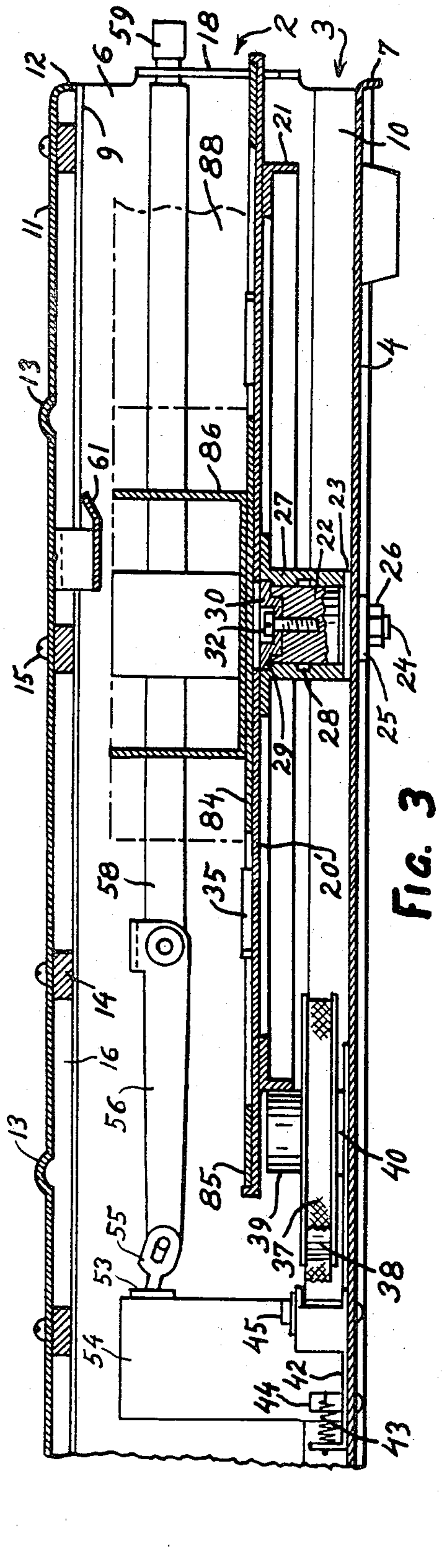
FIGURE 3 is a longitudinal section on the line III—III of FIGURE 2 but showing a modified form of receiving plate.

As shown in FIGURE 1, the cover plate 11 is formed with transversely extending stiffening ribs 13 and is fastened by screws 15 to the upper longitudinal edges 8 and 9 of the side walls 5 and 6 of the housing 1. As shown in FIGURES 1 and 3, spacing bars 14 are provided between the cover plate 11 and the upper longitudinal edges 8, 9 of the side walls 5 and 6 to prevent longitudinal bending of the cover plate.

Figure 2:
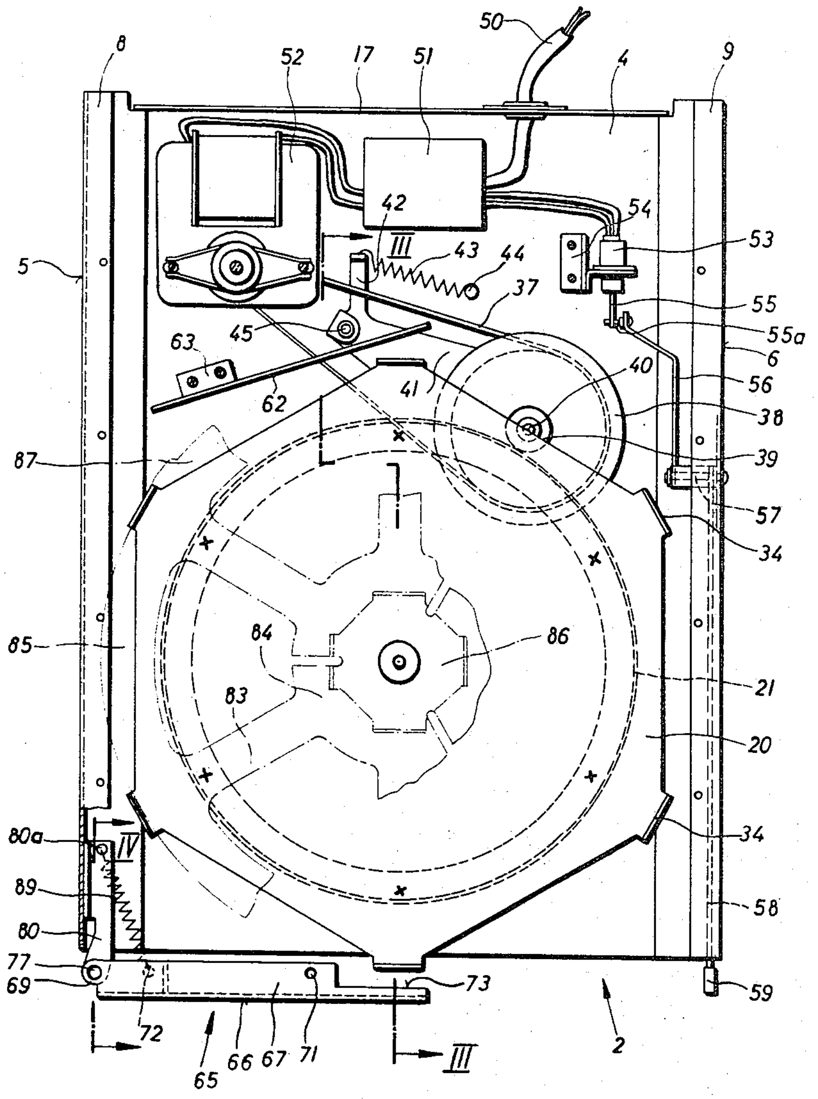
FIGURE 2 is a plan view of the apparatus of FIGURE 1 after removal of the cover plate.

As shown in FIGURE 2, the base 4 has its rear end bent upwardly to form a rear wall 17 through which the flexible electric conductor 50 is passed, as shown in FIGURES 1 and 2. The wall 6 on one side of the housing carries a guide bracket 18 with a slot 19 through which a switch bar 58 extends for controlling the motor, the bar being manipulated by a knob 59.

As viewed through the front open end of the housing 1 in FIGURE 1, the spool 82 with one of its spokes 83 and a portion of its outer rim 85 is visible. In the construction shown in FIGURE 1, the receiving plate 20 (which is underneath the spool) as shown in FIGURES 1 and 2, is provided with lugs 34 for engaging the lugs 87 on the periphery 85 of the spool 82.

Figure 4:
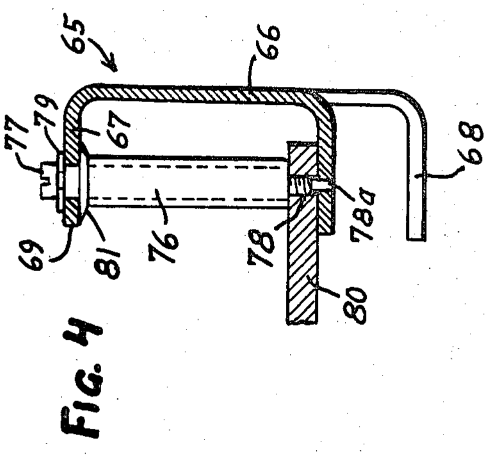
FIGURE 4 is a fragmentary detail of the flap at the front open end of the apparatus, partly in cross-section.

FIGURES 1 and 4 show a pivotally mounted flap 65 for guiding the record carrier 88 on its way in, the flap having upper and lower bearing lugs 69, 70, rotatably mounted at one side of the housing. The flap consists of a front plate 66, an upper flange 67 and a lower flange 68. The upper flange has a post 71 mounted thereon to limit its inward swinging movement.

The flap is pivotally supported by a bracket 80 projecting from the front end of the housing 2 and carrying a bolt 77 that is screwed onto the outer end of the bracket the bearing lugs 69, 70 of the flap being pivotally mounted on the bolt 77.

The free end of the flap is provided with a tape deflecting edge 74 which is inclined to the longitudinal axis of the flap 65. The edge 74 in conjunction with the front edge of the flap 66 has a receiving slot 75 for insertion of the bandlike record carrier 88.

The bandlike record carrier tape 88 is delivered to the tape deflecting edge 74 from the tape receiving edge 73 at the rear side of the flap 65. After its deflection about the edge 73 the record carrier tape 88 moves longitudinally of the flap 65, around the sleeve 76 which surrounds the bolt 77 and from there into the housing through the space between the sleeve and the adjacent side wall. To facilitate the movement of the record carrier tape into the housing, a conical washer 81 is placed on the bolt 77 at the upper end of the sleeve 76.

Since the bolt 77 is secured at only one end thereof to the bearing bracket 80, it is possible for the record carrier tape 88 to be connected to the hub of the spool 82 while the latter is still outside the housing and then lowered into the space between the sleeve and the housing after the spool has been inserted in the housing. This will render unnecessary the inconvenient threading of the record carrier tape into the housing.

The flap 65 is provided with a pin or other anchorage 72 for a spring 89, the other end of which is anchored at **80*a*** to the housing, as shown in FIGURE 2.

FIGURE 2 shows the parts inside the housing with the top cover 11 and the bars 14 removed. In this form of the invention a six-cornered receiving plate 20 is used which is rotatably positioned in the housing. The plate 20 is shown in FIGURES 1 and 2 as supporting a spool 82 having spokes 83 with the rim 85 of the spool 82 resting on it. The outermost perpihery of the spool carries lugs 87 to be engaged by similar lugs 34 on the periphery of the receiving plate 20.

The hub 84 of the spool has a core 86 secured to it, the latter being star-shaped with upwardly projecting extremities.

As shown in FIGURES 2 and 3, to the underside of the receiving plate 20 a friction drum 21 is secured to be driven by a friction wheel 39 which is carried by the belt-pulley 38 for rotation about a common axis 40, the latter being carried by a swinging plate 41 pivoted on an axis 45 and urged in clockwise direction by a spring 43 connected to an arm 42 of the lever and anchored at 44 to the floor. The friction wheel 39 is thereby kept continually in frictional engagement with the friction drum 21 of the receiving plate 20.

The belt pulley 38 is driven by a belt 37 from a motor 52 mounted on the base and connected to an outlet box 51, to be energized by the conductor 50 through the manually controlled switch 53, the latter being mounted on a bracket 54 carried by the base 4 of the bottom box 2.

The motor switch 53 is connected with the switch lever 56 by means of the switch arm 55 and connecting pin 55a, the lever 56 being swung about its pivot 57 by the switch rod 58 extending along the side wall 6 and out of the front end of the housing. With this arrangement the mechanism can be conveniently turned on or off from the front end of the housing.

FIGURE 2 shows a tape- or paper-confining arm 62 which is mounted on the base 4 of the bottom pan 2 by means of a bracket 63. The paper-confining arm 62 can be equipped in a known manner with a disconnecting switch to disconnect the motor when the spool has been wound up to a predetermined radius.

In the lower portion of FIGURE 2 the flap 65 is shown. The spring 89 which is connected between the pin 72 and the pin 80a urges the flap towards the open end of the housing, but such pivotal movement is limited by the stud 71.

FIGURE 3 shows a longitudinal section through a slightly different form of apparatus. With an interposed bottom disk 23 the vertical post 22 is mounted on the base 4 of the bottom pan 2 by means of a threaded end 24 carrying a nut 26 and its washer 25. Rotatably mounted on the post 22 is a hub 27 resting upon the bottom disk 23 and having its bore enlarged at 28. The bottom disk is preferably formed of synthetic resin such as nylon 6–6 with little friction to form a thrust bearing for the lower end of hub 27.

At its upper end the hub 27 is flanged to support the receiving plate 20′ which is welded or otherwise fastened to the flange, depending on the kind of material.

The upper end of the bore of the hub 27 is enlarged at 29 to receive a retaining disk 30 which is fastened to the upper end of post 22 by a screw 32 to prevent axial shifting of the hub on the post.

The friction drum 21 underneath the receiving plate can also be welded or otherwise adhered to the bottom of the receiving plate, depending on the nature of the material.

The receiving plate 20′ supports the outer rim 85 of the spool which can be kept in position by retaining lugs 35 on the plate 20′ (FIG. 3).

In order to ensure accurate centering of the spool on the receiving plate 20′, the outer periphery of the latter is provided with a shallow peripheral flange.

The cross sectional view on FIGURE 3 also shows a side view of the swinging lever 41 upon which the axis 40 for the friction wheel 39 and belt pulley 38 is mounted. The swinging lever 41 itself is mounted on the pivot axis 45.

FIGURE 3 also shows clearly in side elevation the switching mechanism 55–59.

As already stated, the spacing bars 14 in the air passageways 16 between the cover plate 11 and the inwardly bent upper edges 8 and 9 of the side walls prevent the cover plate from being bent inwardly.

As show in the upper part of FIGURE 3, to the under side of the cover plate a tape-guiding bracket 61 is fastened to ensure uniform winding up of the record carrier tape 88.

FIGURE 4 shows in cross-section an enlarged view of the pivotal mounting of the flap 65. In the front end of the bearing bracket 80 the threaded portion 78 of bolt 77 is screwed. The upper bearing 69 of the flap 65 is kept in place by the head of bolt 77 in conjunction with a safety clip 79 while the lower bearing 70 is kept in position merely by the extension 78a below the threaded portion 78 of the bolt 77.

The sleeve 76 around the bolt consists of smooth material and has at its upper end a tape-guiding flange 81.

Figure 5:
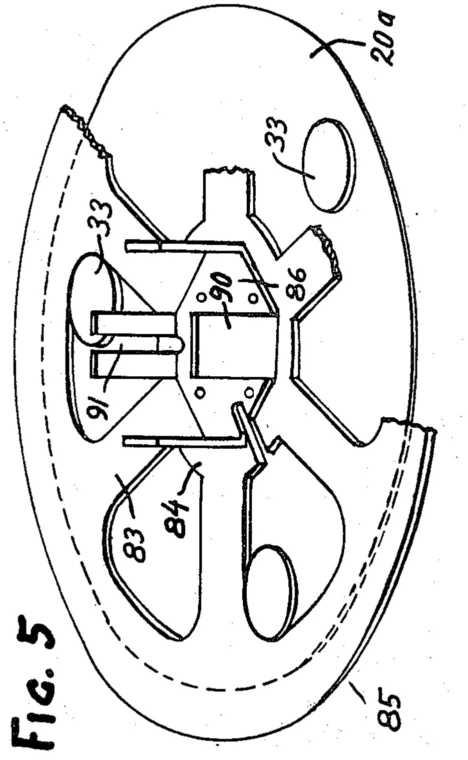
FIGURE 5 is a fragmentary detail of a modified construction.

FIGURE 5 shows another kind of receiving plate 20a in the form of a circular disk carrying retaining members in the form of circular disks 33 mounted on the upper surface of the receiving plate 20a. To permit the use of spools of different sizes, it can be advantageous to position the retainers on the plate in such a manner that they will engage the spokes at their foot ends.

The retainers can also be in the form of lugs stamped out from the flat surface of the plate.

In the construction shown in FIGURE 5, a spool 82 is used whose core 86 consists of a star-shaped attachment with upwardly bent extremities 90, one of which is longitudinally slotted as at 91 to receive the beginning of the record carrier.

As shown by the embodiments shown in the drawings, an advantage of the enclosed winding mechanism of this invention is that the beginning of the record carrier tape can be inserted into the slot 91 shown in FIGURE 5 while the spool is still outside the housing. After opening the flap 65 the spool 82, while being kept approximately parallel to the receiving plate 20 and to the cover plate 11, is introduced into the housing and positioned on the receiving plate. The record carrier 88 is then introduced from above into the slit between the side wall 5 and the sleeve 76 on the bolt 77, the flap 65 being then closed. After the record carrier 88 is passed around the corners 73 and 74, the apparatus is ready for operation.

It will be understood that this invention is susceptible to modification in order to adapt it to different usages and conditions and, accordingly, it is desired to comprehend such modifications within this invention as may fall within the scope of the appended claims.

What is claimed is:

1. A refillable magazine for a horizontally oriented record-carrying tape spool, said magazine comprising a shallow housing having a base, side and top members, said base and top members defining an open front end therebetween for receiving a record-carrying tape spool edgewise, a spool-receiving and supporting plate mounted for rotation on said base and provided with upwardly extending means in fixed positions on said receiving plate and projecting only slightly above the surface of the plate to vertically engage a spool whereby a spool only slightly thinner than said open front end can be moved edgewise into said housing along a substantially horizontal path across the tops of the upwardly extending means and then lowered into position onto the receiving plate, said spool being kept in position on the receiving plate by the combined action of gravity and the upwardly extending means.

2. A refillable magazine for a horizontally oriented record-carrying tape spool, said magazine comprising a shallow housing having a base, side and top members, said base and top members defining an open front end therebetween for receiving a record-carrying tape spool edgewise, a spool-receiving and supporting plate mounted for rotation on said base and provided with a plurality of spool centering and spool retaining members in fixed positions on and projecting only slightly above said receiving plate whereby a spool having a thickness only slightly less than the thickness of said open end is movable edgewise horizontally through the open end into the housing onto and removable from said receiving plate along a substantially horizontal path above the retaining members and lowered onto said receiving plate, said spool being kept in position on the receiving plate by the combined action of gravity and the spool centering and retaining members.

3. A refillable magazine for a horizontally positioned record-carrying tape spool, said magazine comprising a shallow housing having a cover plate, a base and side members, said cover plate and base defining an open front end therebetween for receiving a record-carrying tape spool, a bearing post mounted vertically on said base, a spool-receiving and spool-supporting plate having a hub mounted for rotation on said bearing post and a plurality of spool-centering and spool-retaining members in fixed positions on and projecting only slightly above said receiving plate to engage the bottom of the spool whereby a spool having a thickness only slightly less than the thickness of said open end can be moved horizontally edgewise into said housing and across the tops of the retaining members and then lowered onto the receiving plate, said spool being kept in position on the receiving plate by the combined action of gravity and the spool-centering and spool-retaining members.

4. A refillable magazine for a horizontally positioned record-carrying tape spool, said magazine comprising a shallow housing having a cover plate, a base and side members, said cover plate and base defining an open front end therebetween for receiving a record-carrying tape spool, a bearing post mounted vertically on said base, a spool-receiving and spool-supporting plate having a hub mounted for rotation on said bearing post and a plurality of spool centering and retaining members in fixed positions on and projecting only slightly above said receiving plate to engage the bottom of the spool whereby a spool having a thickness only slightly less than the thickness of said open end can be moved edgewise into said housing along a substantially horizontal path across the tops of the retaining members and then lowered onto said receiving plate and motor-driven winding means mounted in said housing for rotating said receiving plate, said spool being kept in position on the receiving plate by the combined action of gravity and the retaining members.

5. The magazine of claim 4, wherein said receiving plate has a friction drum and said motor winding means has a lever mounted on said base, a pulley mounted for rotation on the end of said lever, a friction wheel connected to said pulley, a motor mounted on said base, a belt connecting said motor and said pulley and spring means connected to said lever whereby said friction wheel engages said friction drum.

6. A refillable magazine for a record carrier tape spool comprising a shallow housing having a cover plate, a base, horizontal stepped portions integral with said base, side walls integral with said stepped portions and an open end for receiving a record carrier tape spool, a bearing post mounted vertically on said base, a receiving plate mounted for rotation on said bearing post, a plurality of spool centering and retaining members on said receiving plate, a frictional drum secured to said receiving plate, a lever mounted on said base, a pulley mounted for rotation on the end of said lever, a friction wheel connected to said pulley, a motor mounted on said base, a belt connecting said motor and said pulley, and a spring having one end connected to said lever and the other end anchored to the base whereby said friction wheel yieldingly engages said friction drum.

7. The magazine of claim 6, wherein said cover plate comprises a plurality of transverse stiffening ribs, front and rear edges integral with said cover plate and a plurality of spacing bars and screw means connecting said side walls whereby air passageways are provided between said cover plate and said side walls.

8. The magazine of claim 6, wherein said receiving plate is mounted on a vertical bearing post, said bearing post mounted vertically on said base and having a hub concentric thereto and a plastic bottom disk interposed between said bearing post and said base whereby said disk supports said hub and said hub supports said receiving plate.

9. The magazine of claim 8, wherein said bearing post has a retaining disk attached thereto connecting said hub whereby said hub is prevented from sliding longitudinally on raid bearing post.

10. The magazine of claim 6, wherein said receiving plate is circular and has circular disk retaining members whereby the spokes of a spool are engaged.

11. The magazine of claim 6, wherein said receiving plate is hexagonal and has lugs at the corners of the hexagon whereby lugs on the periphery of a spool are engaged.

12. The magazine of claim 7, wherein said cover plate has a tape guiding member secured to the underside thereof.

13. The magazine of claim 2, further comprising a bearing bracket connected to said base at said open end, a bolt mounted on said bracket, a flap pivotally mounted on said bolt, a tape inlet edge on said flap and a tape deflecting edge whereby said flap is adapted to partially close said open end and a record carrier tape is introduced into said housing under said tape receiving edge, over said tape deflecting edge and over said bolt.

14. The magazine of claim 13, further comprising upper and lower lugs on said bolt pivotally holding said flap and spring means connecting said flap and said bracket.

15. The magazine of claim 13, wherein said flap comprises a front plate, an upper flange and a lower flange, said tape deflecting edge located at the free end of said front plate and said tape receiving edge located on said upper flange.

16. The magazine of claim 13, further comprising a sleeve over said bolt whereby a record carrier tape passes over said sleeve on its way from said front plate, through the space between said bolt and wall and into the interior of said housing.

17. The magazine of claim 1, wherein said upwardly extending means include a peripheral flange on the receiving plate.

References Cited

UNITED STATES PATENTS

| | | | |
|---|---|---|---|
| 2,904,277 | 9/1959 | Underwood | 242—68.3 |
| 2,978,198 | 4/1961 | Bierman | 242—55.12 |
| 2,987,265 | 6/1961 | Quinones | 242—57 X |
| 3,043,533 | 7/1962 | Faulkner et al. | 242—57 X |
| 3,051,405 | 8/1962 | Lyon. | |
| 3,273,815 | 9/1966 | Schuller | 242—55.13 X |

GEORGE F. MAUTZ, *Primary Examiner.*